United States Patent

Yamada et al.

[11] Patent Number: 5,880,797
[45] Date of Patent: Mar. 9, 1999

[54] LCD WITH DIFFERENT SURFACE FREE ENERGIES BETWEEN INSULATOR AND PIXEL ELECTRODE

[75] Inventors: Nobuaki Yamada, Higashiosaka; Shuichi Kozaki, Nara, both of Japan

[73] Assignee: Sharp Kabushiki Kaisha, Osaka, Japan

[21] Appl. No.: 774,303

[22] Filed: Dec. 24, 1996

[30] Foreign Application Priority Data

Dec. 25, 1995 [JP] Japan .................................. 7-337483

[51] Int. Cl.$^6$ .......................... G02F 1/1333; G02F 1/136; G02F 1/1343
[52] U.S. Cl. .................. 349/84; 349/42; 349/89; 349/138; 349/139
[58] Field of Search .............. 349/129, 89, 138, 349/84, 42

[56] References Cited

U.S. PATENT DOCUMENTS

| | | | |
|---|---|---|---|
| 5,032,883 | 7/1991 | Wakai et al. | 257/59 |
| 5,418,635 | 5/1995 | Mitsui et al. | 349/113 |
| 5,473,450 | 12/1995 | Yamada et al. | 349/84 |
| 5,559,617 | 9/1996 | Mitsui et al. | 349/96 |
| 5,576,856 | 11/1996 | Kawazu et al. | 349/89 |
| 5,583,675 | 12/1996 | Yamada et al. | 349/84 |
| 5,641,974 | 6/1997 | den Boer et al. | 349/138 |
| 5,643,471 | 7/1997 | Onishi | 349/84 |
| 5,673,092 | 9/1997 | Horie et al. | 349/84 |
| 5,682,211 | 10/1997 | Yao et al. | 349/38 |

FOREIGN PATENT DOCUMENTS

| | | |
|---|---|---|
| 58-501631 | 9/1983 | Japan . |
| 61-502128 | 9/1986 | Japan . |
| 63-158521 | 7/1988 | Japan . |
| 4-120516 | 4/1992 | Japan . |
| 4-219928 | 8/1992 | Japan . |
| 4-338923 | 11/1992 | Japan . |
| 5-27242 | 2/1993 | Japan . |
| 6-194655 | 7/1994 | Japan . |
| 6-265902 | 9/1994 | Japan . |
| 6-301015 | 10/1994 | Japan . |
| 6-308496 | 11/1994 | Japan . |
| 6-324337 | 11/1994 | Japan . |
| 6-337405 | 12/1994 | Japan . |
| 7-120728 | 5/1995 | Japan . |
| 8-292423 | 11/1996 | Japan . |

*Primary Examiner*—William L. Sikes
*Assistant Examiner*—Toan Ton
*Attorney, Agent, or Firm*—Nixon & Vanderhye, P.C.

[57] ABSTRACT

A liquid crystal display device having a pair of substrates with a display medium interposed therebetween, includes: a plurality of scanning lines and a plurality of data lines provided on one of the pair or substrates so as to cross each other; a plurality of switching elements, each of the switching elements being connected with one of the scanning lines and one of the data lines; an insulating layer provided so as to cover the plurality of scanning lines, the plurality of data lines, and the plurality of switching elements; a plurality of pixel electrodes provided on the insulating layer, each of the pixel electrodes partially overlapping at least one scanning line and at least one data line; and a plurality of contact holes formed in the insulating layer, through each of which an output terminal of a respective switching element and a respective pixel electrode are connected. The display medium contains a liquid crystal material, and liquid crystal molecules of the liquid crystal material are oriented in at least two directions on at least one of the pair of substrates.

12 Claims, 15 Drawing Sheets

Axes of polarizing plate

Axes of polarizing plates

LCD WITH DIFFERENT SURFACE FREE ENERGIES BETWEEN INSULATOR AND PIXEL ELECTRODE

BACKGROUND OF THE INVENTION

1. Field of the Invention

The present invention relates to a liquid crystal display device having a sufficiently wide viewing angle which can be used in flat displays incorporated in, for example, portable information terminal devices, personal computers, word processors, amusement equipment and televisions viewed by a plurality of people, as well as display boards employing a shutter effect and display devices provided on windows, doors or walls.

2. Description of the Related Art

A conventional liquid crystal display device is known which includes a pair of substrates and a liquid crystal layer interposed therebetween. On one of the pair of substrates, scanning lines, data lines, switching elements and pixel electrodes are provided. The scanning lines and the data lines are provided so as to cross each other. Each of the switching elements is provided to be connected with the respective scanning line and data line. Each of the pixel electrodes is provided in a respective rectangular region enclosed by the scanning lines and the data lines to be in connection with the respective switching element.

In such a liquid crystal display device, each pixel electrode needs to be provided in the respective rectangular region without making a contact with the crossing scanning lines and data lines. Therefore, each pixel electrode is formed so that the periphery thereof is separated from the scanning lines and the data lines. As a result, the pixel electrode is made small, which results in a low aperture ratio.

A liquid crystal display device is proposed which is capable of providing a higher aperture ratio (Japanese Laid-Open Patent Publication No. 4-120516). The liquid crystal display device described in the above-mentioned publication includes a pair of substrates, a liquid crystal display layer interposed therebetween, scanning lines and data lines provided in a crossing manner on one of the pair of substrates, and switching elements provided in connection with the scanning lines and the data lines. Pixel electrodes are provided on an insulating layer covering the scanning lines, the data lines and the switching elements. Each of the pixel electrodes is connected with an output terminal of the respective switching element via a contact hole formed in the insulating layer.

In such a liquid crystal display device, the scanning lines and the data lines are provided on a different level from the pixel electrodes. Thus, even when the pixel electrodes are overlaid above the scanning lines and the data lines, the pixel electrodes are prevented from being shortcircuited therewith. Accordingly, the pixel electrodes can be made larger than those of a liquid crystal display device in which pixel electrodes, the scanning lines and the data lines are provided generally on the same level. Furthermore, an electric field occurring in a horizontal direction between each pixel electrode and the respective scanning and data lines can be minimized, thereby restraining defective orientation.

Although such a liquid crystal display device may be capable of obtaining a high aperture ratio, there still remains a problem of a poor viewing angle characteristic owing to the usage of TN (twisted nematic) mode. This is due to the following reasons.

Conventionally, TN or STN (super twisted nematic) liquid crystal display devices employing a nematic liquid crystal material are put into practical use as display devices utilizing an electro-optic effect. Such liquid crystal display devices require polarizing plates as well as an alignment layer. In such a liquid crystal device, liquid crystal molecules function as follows. As shown in FIG. 15A, the liquid crystal molecules are provided with a pretilt angle under an initial orientation state (i.e., a state with no voltage applied). As shown in FIG. 15B, the liquid crystal molecules rise in the same direction (rotate in the same direction) under application of a voltage. Under such a state, transmittance of the liquid crystal device varies relative to various viewing directions. For instance, the transmittance is different when viewed from directions represented by arrows A and B (hereinafter, simply referred to as "directions A and B"). Moreover, at a gray scale level, phenomena that remarkably deteriorate the display quality, such as inversion, may occur depending on the viewing angle. A cell of the liquid crystal display device under application of a saturation voltage is shown in FIG. 15C.

In order to minimize the inversion which occurs due to a narrow viewing angle characteristic of a liquid crystal display device, the following five types of liquid crystal display apparatuses with wider viewing angle characteristics have been proposed.

A first liquid crystal display apparatus includes two polarizing plates disposed so that the polarizing axes are perpendicular to each other with a polymer-dispersed liquid crystal device sandwiched therebetween (Japanese Laid-Open Patent Publication No. 4-338923 and Japanese Laid-Open Patent Publication No. 4-212928). Although the liquid crystal display apparatus has a great effect in improving the viewing angle characteristic thereof, the liquid crystal display apparatus has low merit for practical use since the liquid crystal display apparatus basically employs depolarization by scattering and thus the brightness is half as much as the brightness of a typical TN liquid crystal display apparatus.

A second liquid crystal display apparatus includes random liquid crystal domains for enhanced viewing angle characteristics. Such random liquid crystal domains are obtained by disturbing the orientation of the liquid crystal molecules, for example, by polymer walls or protrusions (Japanese Laid-Open Patent Publication No. 5-27242). Since the liquid crystal display apparatus includes random liquid crystal domains, the polymer material spreads over to picture element regions. Each picture element region is defined between each pixel electrode and a region of a counter electrode corresponding to the pixel electrode, including the pixel electrode and the region of the counter electrode corresponding to the pixel electrode. Moreover, disclination lines between the liquid crystal domains are randomly generated and such disclination lines are not eliminated even under application of a voltage. Consequently, the second liquid crystal display apparatus has a lower light transmittance under no applied voltage and a lower contrast under application of a voltage due to a lower black level.

A third liquid crystal display apparatus has a remarkably improved viewing angle characteristic since the liquid crystal molecules in each picture element region are oriented in an axially-symmetric manner within a polymer wall (Japanese Laid-Open Patent Publication No. 6-301015 and Japanese Laid-Open Patent Publication No. 7-120728), or alternatively since the liquid crystal molecules are oriented in a concentric or radial manner between the upper and lower substrates by subjecting the picture element regions to an alignment treatment (Japanese Laid-Open Patent Publication No. 6-324337 and Japanese Laid-Open Patent Publication No. 6-265902). As shown in FIG. 15D, the former liquid crystal display apparatus includes a pair of substrates 101 and 102 and liquid crystal molecules 109 in a liquid crystal region 108 enclosed by a polymer wall 107. The liquid crystal molecules 109 are oriented in an axially-symmetric manner by the polymer wall 107, and are given a pretilt angle under an initial orientation state. In FIG. 15D, reference numeral 110 denotes a disclination line. As shown in FIG. 15E, when a voltage is applied, the liquid crystal molecules 109 rise in the same direction (rotate in the same direction). Under such a state, a generally uniform transmittance is obtained when viewed from either directions A or B. A cell of the liquid crystal display device under application of a saturation voltage is shown in FIG. 15F.

The former liquid crystal display device, however, has a difficulty in controlling the pretilt angle and pretilt direction. On the other hand, the latter liquid crystal display device has a difficulty in performing concentric or radial orientation treatment for each of the picture element regions in terms of mass-production.

A fourth liquid crystal display apparatus includes an alignment film made of a crystalline polymer having spherulites. A spherulite is a spherical polycrystal in which a plurality of crystals are radially arranged starting from one point. Liquid crystal molecules are radially aligned along the spherulites, thereby enhancing the viewing angle characteristics (Japanese Laid-Open Patent Publication No. 6-308496).

A fifth liquid crystal display apparatus includes liquid crystal molecules randomly oriented by applying alignment films on substrates with an alignment treatment such as rubbing (Japanese Laid-Open Patent Publication No. 6-194655). When a voltage is applied to such a liquid crystal display apparatus, disclination lines are generated between liquid crystal domains due to a reverse tilt, thereby resulting in lower contrast.

The above-described liquid crystal display apparatuses with wide viewing angles have a region where a polarizing axis of the polarizing plates and an orientating axis do not align with respect to each other. As a result, the transmittance of such a liquid crystal display apparatus is reduced by at least about 10% compared with that of a conventional TN liquid crystal display apparatus. In the case of liquid crystal display device of an axially symmetrically aligned micro cell mode (hereinafter, simply referred to as an "ASM" mode) disclosed in Japanese Laid-Open Patent Publication No. 6-301015, lattice-like walls made of polymer are necessary to be provided outside the pixel electrodes in order to achieve an axially-symmetric orientation with high repeatability. Furthermore, convex portions are also necessary to be formed in a counter substrate (on which a color filter is provided) for accurate positioning of the axially-symmetric orientation axes. Accordingly, the number of steps for producing the liquid crystal display apparatus is increased. Moreover, if spacers, which are used to maintain uniform thickness of the cell, are dispersed in the picture element regions, axially-symmetric orientation is prohibited. In this regard, the spacers are necessary to be fixed outside the picture element regions.

SUMMARY OF THE INVENTION

A liquid crystal display device having a pair of substrates with a display medium interposed therebetween, includes: a plurality of scanning lines and a plurality of data lines provided on one of the pair of substrates so as to cross each other; a plurality of switching elements, each of the switching elements being connected with one of the scanning lines and one of the data lines; an insulating layer provided so as to cover the plurality of scanning lines, the plurality of data lines, and the plurality of switching elements; a plurality of pixel electrodes provided on the insulating layer, each of the pixel electrodes partially overlapping at least one scanning line and at least one data line; and a plurality of contact holes formed in the insulating layer, through each of which an output terminal of a respective switching element and a respective pixel electrode are connected. The display medium contains a liquid crystal material, and liquid crystal molecules of the liquid crystal material are oriented in at least two directions on at least one of the pair of substrates.

In one embodiment of the invention, the liquid crystal molecules are oriented in an axially-symmetric orientation with respect to an axis perpendicular to surfaces of the pair of substrates.

In another embodiment of the invention, the liquid crystal molecules are twisted between the pair of substrates by about 90°.

In another embodiment of the invention, at least one liquid crystal region exists over each of the pixel electrodes, the liquid crystal region including the liquid crystal molecules oriented in an axially-symmetric manner.

In another embodiment of the invention, the at least one liquid crystal region is surrounded by a region made mainly of a polymer material.

According to another aspect of the invention, a liquid crystal display device includes a concave portion formed in a portion of the insulating layer corresponding to a center of each of the pixel electrodes, whereby a position of an axially-symmetric orientation axis is controlled.

In another embodiment of the invention, each of the plurality of pixel electrodes has either a spherically concave structure or a step structure for controlling a position of an axially-symmetric orientation axis.

According to another aspect of the invention, a liquid crystal display device includes at least one thickness adjustor provided between the pair of substrates, the adjustor being provided over at least the scanning lines or the data lines, whereby a gap between the pair of substrates is maintained.

In another embodiment of the invention, a surface free energy of the surface of the insulating layer is approximately 40 mN/m or less.

According to another aspect of the invention, a liquid crystal display device includes a polymer wall provided outside the pixel electrode or at least a portion outside a picture element region, the picture element region corresponding to a portion defined between the pixel electrode and a counter electrode. The height of the polymer wall is less than the thickness of the cell.

In another embodiment of the invention, the polymer wall is made of a black resist.

Thus, the invention described herein makes possible the advantages of (1) providing a liquid crystal display device capable of enhancing viewing angle characteristic and transmittance thereof, (2) providing a liquid crystal display device in which spacers are naturally provided outside picture element regions, and (3) providing adjustors for positioning axially-symmetric orientation axes on an active matrix substrate without increasing the number of production steps.

These and other advantages of the present invention will become apparent to those skilled in the art upon reading and understanding the following detailed description with reference to the accompanying figures.

DESCRIPTION OF THE PREFERRED EMBODIMENTS

Hereinafter, an outline of the present invention will be described with reference to the accompanying drawings.

Figure 1A:
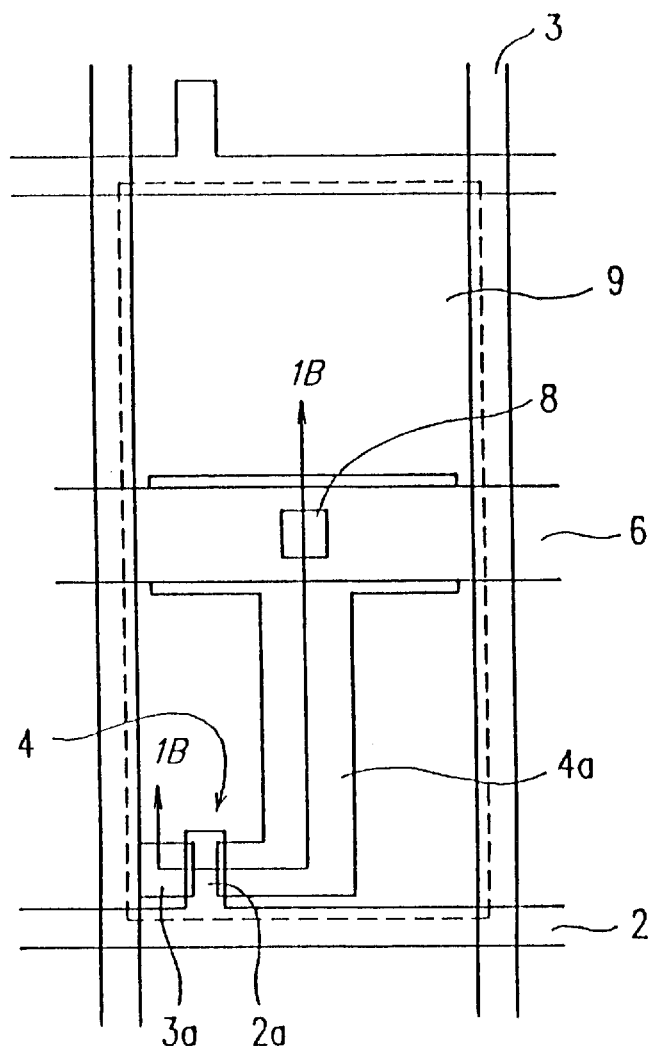
FIG. 1A is a plan view showing an exemplary active matrix substrate used in a liquid crystal display device according to the present invention.
Figure 1B:
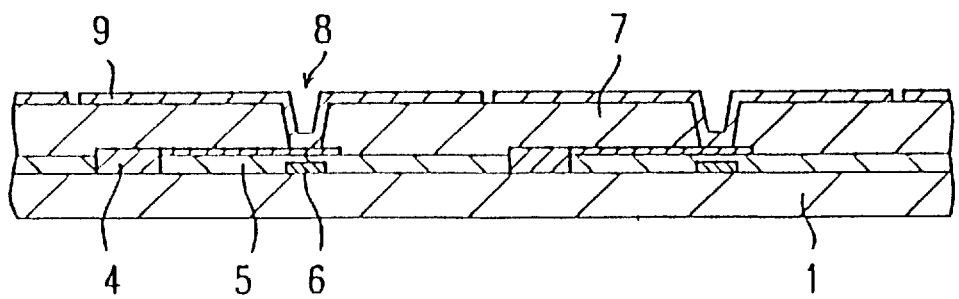
FIG. 1B is a cross-sectional view taken along line A–A' of FIG. 1A.
Figure 2:
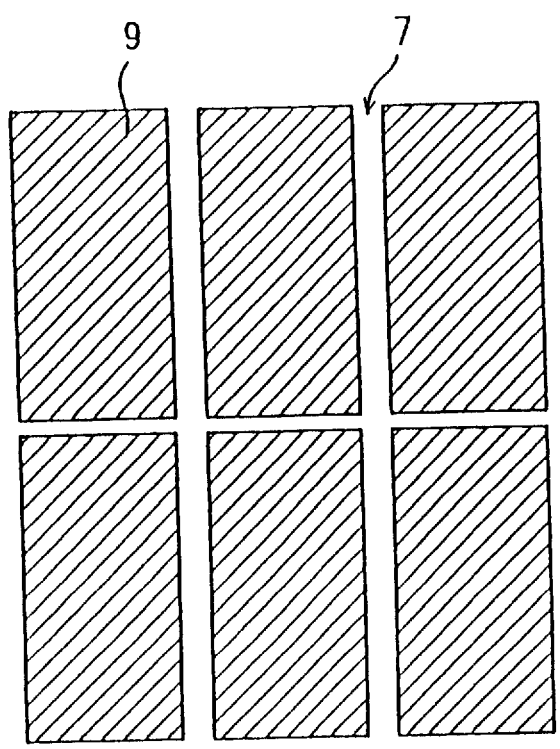
FIG. 2 is a plan view showing a surface of the active matrix substrate shown in FIG. 1.

With reference to FIGS. 1A and 1B, and FIG. 2, an exemplary active matrix substrate having switching elements, which is used in a liquid crystal display device according to the present invention will be described. The active matrix substrate and a counter substrate (not shown) are disposed so as to face each other with a display medium containing a liquid crystal material interposed therebetween.

Referring to FIGS. 1A and 1B, and mainly referring to FIG. 1A, gate bus lines 2 as scanning lines and source bus lines 3 as data lines are provided on a base substrate 1. A thin film transistor (hereinafter, simply referred to as a "TFT") 4 is provided as a switching element in connection with the gate and source bus lines 2 and 3. The TFT 4 includes a gate electrode 2a protruding from the gate bus line 2, a source electrode 3a protruding from the source bus line 3 and a drain electrode 4a. A tip portion of the source electrode 3a is overlaid on the gate electrode 2a with a gate insulating film 5 interposed therebetween. One end portion of the drain electrode 4a is overlaid on the gate electrode 2a with the gate insulating film 5 interposed therebetween, and the other end portion of the drain electrode 4a is positioned in a center portion of a rectangular region enclosed by the gate and source bus lines 2 and 3 and parallel to the gate bus lines 2. Below the other end portion of the drain electrode 4a and beneath the gate insulating film 5, a metal storage capacitor line 6 is provided which is connected with a common line (not shown).

Furthermore, an interlayer insulating layer 7 is provided to cover the gate bus lines 2, the source bus lines 3 and the TFT 4. A contact hole 8 is formed in the interlayer insulating layer 7 above the other end portion of the drain electrode 4a. As shown in FIG. 1B, a pixel electrode 9 made of a transparent electrode material such as ITO is provided on the interlayer insulating layer 7 such that a portion of the pixel electrode 9 fills the contact hole 8 to be connected with the drain electrode 4a via the contact hole 8. Accordingly, the obtained substrate has a pixel on passivation configuration.

The periphery of the pixel electrode 9 extends over to the gate bus lines 2 and the source bus lines 3. Moreover, as shown in FIGS. 1B and 2, a slight space is provided between two adjacent pixel electrodes 9 to be disconnected from each other.

The active matrix substrate having the pixel on passivation configuration includes the pixel electrodes 9 which partially cover the gate bus lines 2 and the source bus lines 3, and which are provided at a different level from the gate bus lines 2 and the source bus lines 3. Thus, when compared with the conventional active matrix substrate in which pixel electrodes and bus lines are provided at the same level, the active matrix substrate according to the present invention can have larger pixel electrodes and thus can obtain a higher aperture ratio. Moreover, even though the pixel electrodes 9 are provided to cover the gate bus lines 2 and the source bus lines 3, the pixel electrodes 9 are prevented from being shortcircuited therewith due to the interlayer insulating layer 7 existing therebetween.

The contact hole 8 for electrical connection between the pixel electrode 9 and the drain electrode 4a can also be formed in a position different from that shown in FIGS. 1A and 1B.

As shown in FIG. 2, the pixel electrodes 9 are separately provided on the interlayer insulating layer 7 such that a portion of the interlayer insulating layer 7 along the periphery of the pixel electrodes 9 is exposed. In other words, a transparent electrode material such as ITO is patterned so as to be surrounded by an insulating material having different surface free energy from that of the transparent electrode material. Thus, phase-separation can be conducted to obtain a liquid crystal region and a polymer region 100 (FIG. 9) without patterning lattice-like resist along the periphery of the pixel electrodes 9. Accordingly, the production process can be simplified.

Preferably, the surface free energy of the interlayer insulating layer 7 is set to be 40 mN/m or less so that the difference between the surface free energy of the interlayer insulating layer 7 and that of the pixel electrode 9 made of a transparent electrode material such as ITO, e.g., approximately 80 mN/m to 100 mN/m, is made large. As a result, a mixture containing a liquid crystal material, a photo-curing resin and the like as a display medium is phase-changed such that a relatively liquid crystal molecule-rich liquid crystal phase is concentrated above the pixel electrode and a relatively photo-curing resin-rich isotropic phase is concentrated on a surface of the interlayer insulating layer 7. If a photo-curing resin is exposed to light under such a state, polymer walls can be formed outside the picture element regions 201, and liquid crystal regions can be formed inside the picture element regions 201, thereby forming a display medium.

Figure 3:
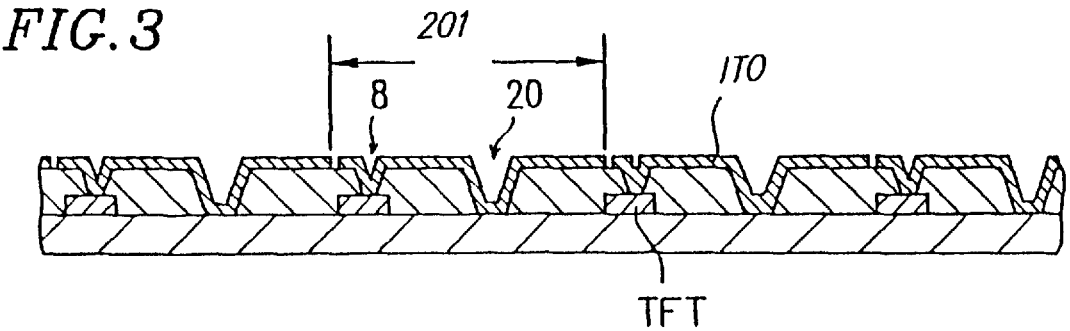
FIG. 3 is a cross-sectional view showing another type of active matrix substrate used in a liquid crystal display device according to the present invention.
Figure 4A:
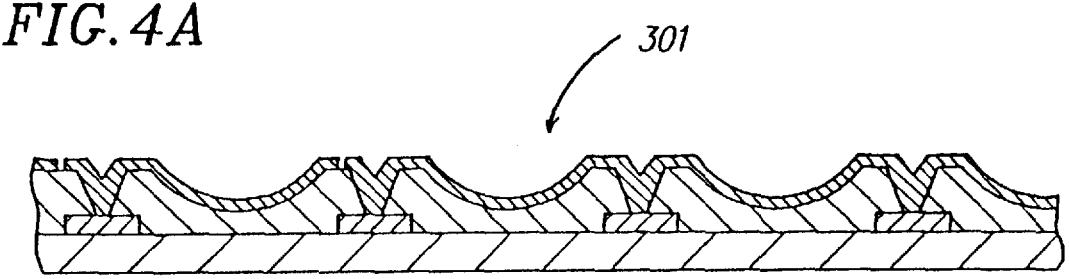
FIG. 4A is a cross-sectional view showing an active matrix substrate having a spherically concave structure.
Figure 4B:
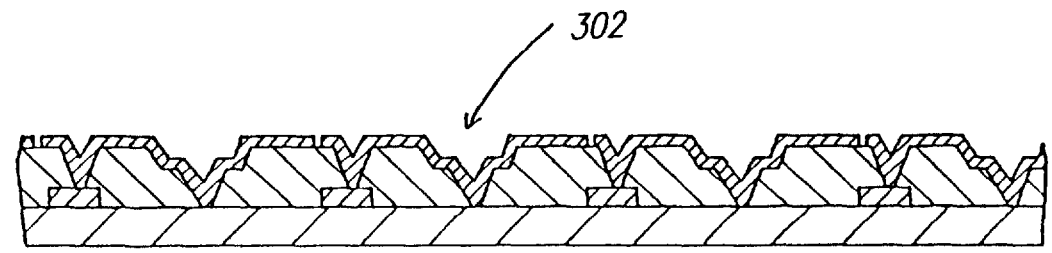
FIG. 4B is a cross-sectional view showing an active matrix substrate having a step structure.

Furthermore, as shown in FIG. 3, in the step of forming the contact holes 8 in the interlayer insulating layer 7, a contact-hole-like concave portion 20 can be formed in the center portion of the picture element region 201 at the saute time for controlling the positions of the axially-symmetric orientation axes. When such a substrate is used in an ASM liquid crystal display device, each of the axially-symmetric orientation axes are positioned generally in a center portion of the respective picture element region 201 due to the concave portion 20, whereby an excellent display characteristic with no display roughness is obtained. As shown in FIG. 4A, the position of the axes can also be controlled by forming spherically concave portions 301 in the surfaces of the pixel electrodes and the substrate, or as shown in FIG. 4B, by forming steps 302 in the pixel electrodes thereby incrementally-increasing the depth of the concave portion near the center of concave portion. Alternatively, as shown in FIG. 1B, the contact hole 8 can be formed in the center portion of the picture element region 201 for controlling the position of the axes. In this case, the above-described concave holes 20 are not necessary to be provided.

Accordingly, the orientation of the liquid crystal molecules is prevented from being disturbed at the contact holes 8, the concave portion 20, and the like due to the axes that appear in the vicinity of the contact holes 8, the concave portion 20 and the like.

Hereinafter, three methods for forming an axially-symmetric orientation liquid crystal display device will be described.

According to a first method, a mixture containing a liquid crystal material and a photo-curing resin is injected into a cell. Photo masks with shielding regions for forming picture element regions 201 are provided on the outer surfaces of the resultant cell. Then, the photo-curing resin is cured by sufficiently parallel ultraviolet light while applying a voltage to the mixture at a temperature equivalent to or higher than a phase-transition temperature of the liquid crystal material. Thereafter, the cell is gradually cooled down to room temperature to orient the liquid crystal molecules in an axially-symmetric manner.

Figure 5A:
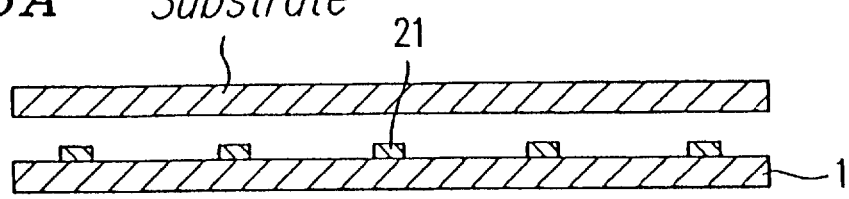
FIG. 5A is a schematic cross-sectional view showing a structure of a cell including a substrate having resist walls.
Figure 5B:
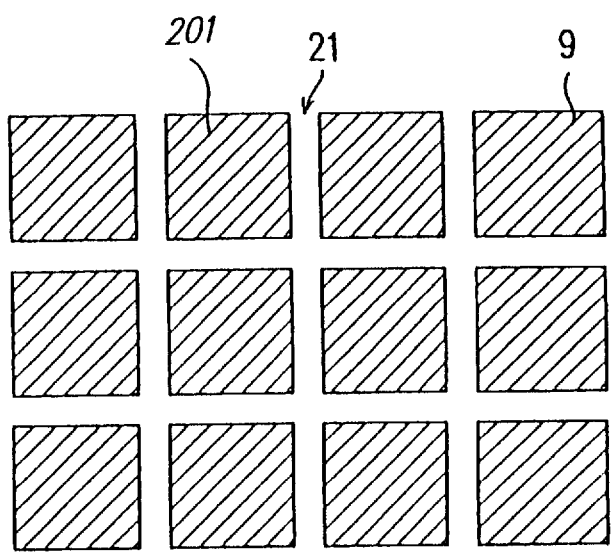
FIG. 5B is a plan view showing the substrate having the resist walls.

According to a second method, a cell is formed by using materials having different surface tensions. Referring to FIGS. 5A and 5B, pixel electrodes 9 made of ITO and resist walls 21 are provided on a substrate 1 to fabricate a cell. A mixture containing a liquid crystal material and a photo-curing resin is injected into the cell, which is heated until a homogeneous state is obtained. Then, the mixture is gradually cooled down to room temperature while a voltage is applied to the mixture, to orient the liquid crystal molecules in an axially-symmetric manner. In this case, the height of the resist wall 21 is less than the length of the gap between the substrates. According to the second method, however, in the case where the width of the bus lines is narrow, the liquid crystal region above the resist walls 21 can be seen through the resist walls 21 when viewed from a direction inclined from a normal to the substrate, whereby light leakage occurs. In order to restrain such a phenomenon, a resist added with a colorant or a colored resist is used for forming the resist walls 21 so that the light is absorbed.

According to a third method, a cell is produced by employing a substrate on which materials having different surface tensions are patterned. A mixture containing a liquid crystal material and a photo-curing resin is injected into the cell which is heated until a homogeneous state is obtained. Then, the mixture is gradually cooled down to deposit the liquid crystal phase. The cell is again heated to reduce the size of the liquid crystal region under a condition that the liquid crystal phase is not eliminated. At such a temperature, a voltage is applied to obtain an axially-symmetric orientation state (i.e., to perform an axially-symmetric orientation treatment). Then, the cell is gradually cooled down to increase the size of the liquid crystal region having the liquid crystal molecules oriented in an axially-symmetric manner. Thereafter, ultraviolet light is radiated on the liquid crystal region to fix the liquid crystal region in an axially-symmetric state (i.e., performing an orientation fixing treatment). Meanwhile, a voltage may be applied to the cell to stabilize the axially-symmetric orientation.

The active matrix substrates used in the liquid crystal display device according to the present invention turned out to be extremely effective in the case where regions of different surface tensions are patterned as described in the second and third methods. Specifically, the active matrix substrate can provide an axially-symmetrical orientation state without resist walls for obtaining a difference in surface tensions.

Hereinafter, methods for fixing spacers on the substrate will be described. The spacers are used to adjust and maintain the thickness of the cell. However, the presence of the spacers in picture element regions 201 prohibits the axially-symmetric orientation. In this regard, the spacers need to be fixed outside the picture element regions 201.

The following three methods can be used for fixing the spacers outside the picture element regions 201.

According to a first method, spacers are mixed in resist walls which are fixed outside picture element regions 201. In order to restrain the adverse effect caused by spacers projecting from the resist walls toward the picture element region 201 in a horizontal direction, second resist walls which are thicker than the first resist walls may be formed to cover the projecting spacers.

According to a second method, pillar-like or wall-like protrusions having a sufficient thickness to act as spacers are formed outside the picture element regions 201.

Figure 6:
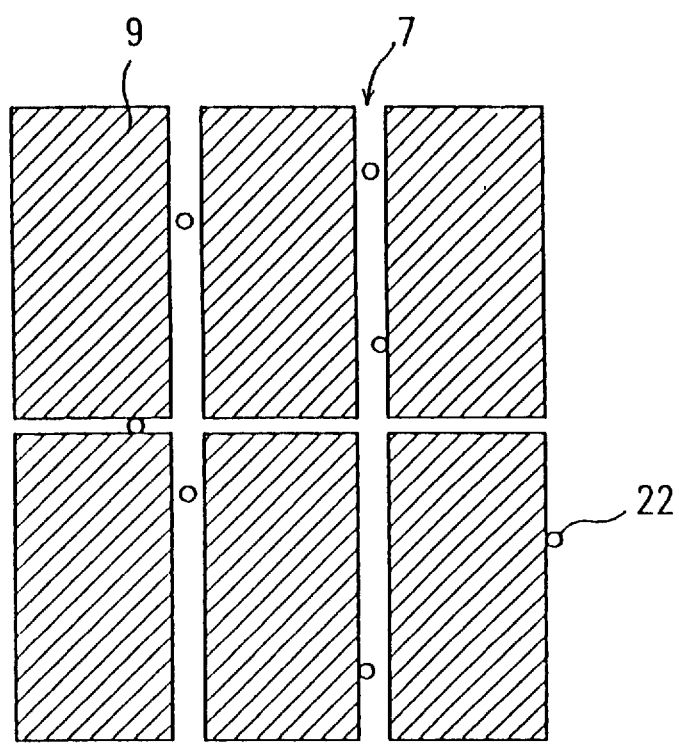
FIG. 6 is a plan view showing an active matrix substrate with scattered spacers.

According to a third method, spacers are blown over an active matrix substrate. As shown in FIG. 6, a pixel electrode (i.e., a conductor) 9 and an interlayer insulating layer (ire., an insulator) 7 are patterned on each of the picture element regions 201 of an active matrix substrate used in a liquid crystal display device according to the present invention. When spacers 22 made of an insulating material are scattered on such a substrate, the spacers have a different adhesion to the pixel electrode 9 and the interlayer insulating layer 7, and tend to stick to the interlayer insulating layer 7 (i.e., an insulating material) due to a Coulomb force. Thus, all the spacers can be blown with appropriate force using, for example, nitrogen gas so that the spacers stay only on the interlayer insulating layer 7 outside the picture element regions 201.

Three-terminal elements such as TFTs, two-terminal elements such as MIMs, or the like can be used as the switching elements in the liquid crystal display device according to the present invention. A driving method such as active driving is possible using such switching elements. The switching elements can be made of any conventional semiconductor material such as amorphous Si, p-Si (polysilicon) crystallized at low temperature (low-temperature p-Si) or p-Si crystallized at high temperature (high-temperature p-Si).

Hereinafter, materials used for an active matrix substrate will be described. The substrate is made of a transparent solid material which allows transmittance of visible light, such as glass, quartz or plastics.

Although a mixture containing a liquid crystal material and a photo-curing resin is described as a display medium in the above example, other material can be also used according to the present invention. When an alignment layer having spherulites for axially-symmetric orientation is formed on the substrate, use of only a liquid crystal material is sufficient. Alternatively, a mixture containing a liquid crystal material and a thermosetting resin can also be used. In this case, the mixture is subjected to distributed heating.

The liquid crystal molecule orientation of a liquid crystal display device according to the present invention is not limited to an axially-symmetric orientation. Other types of orientation can be used as long as the liquid crystal molecules are oriented in more than one direction. For example, orientation in a spiral, radial or concentric manner can be applied.

Hereinafter, the present invention will be described by way of illustrative examples with reference to the accompanying drawings. The present invention, however, is not limited to any of the following examples.

EXAMPLE 1

Figure 7:
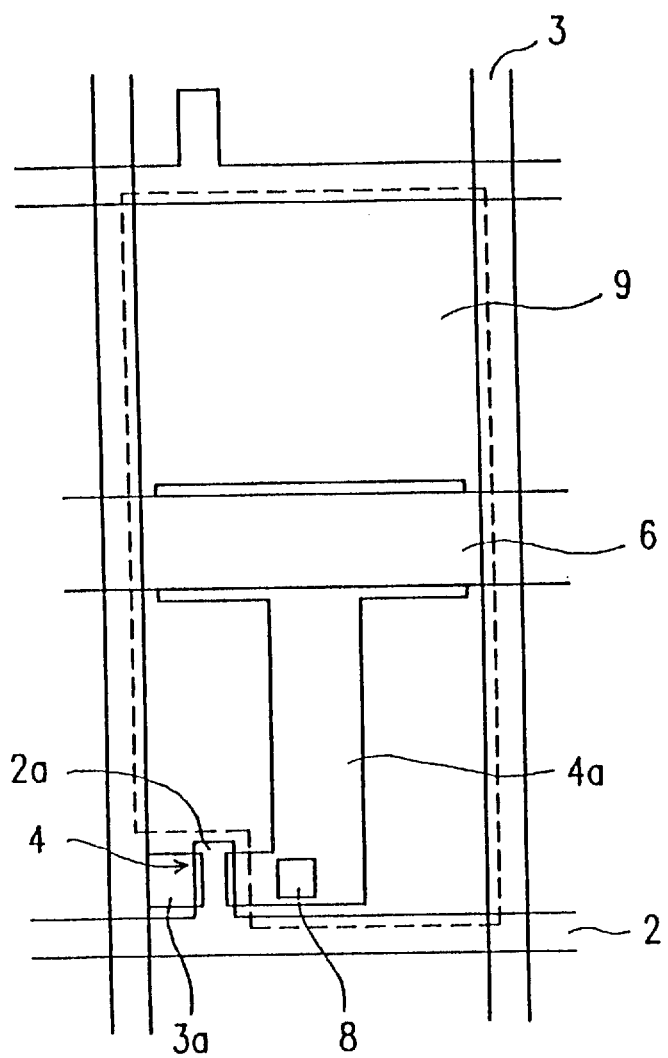
FIG. 7 is a plan view showing an active matrix substrate used in a liquid crystal display device according to a first example of the present invention.

FIG. 7 is a plan view showing a single picture element region 201 of an active matrix substrate of a transmissive liquid crystal display device according to a first example of the present invention.

The active matrix substrate includes a plurality of pixel electrodes 9 disposed in a matrix, and gate bus lines 2 as scanning. Lines and source bus lines 3 as data lines. The gate bus lines 2 and the source bus lines 3 are provided so as to cross each other and to surround each pixel electrode 9. A portion of each gate bus line 2 and a portion of each source bus line 3 overlap the peripheral portion of each pixel electrode 9.

Referring to FIG. 7, a TFT 4 connected with the pixel electrode 9 is provided in the vicinity of the intersection of the gate bus line 2 and the source bus line 3 as a switching element. The driving of the TFT 4 is controlled by signals input to a gate electrode 2a of the TFT 4 which is connected to the gate bus line 2. Data signals from a driving circuit are input to the source electrode 3a of the TFT 4 via the source bus line 3 connected to the source electrode 3a. A drain electrode 4a of the TFT 4 has one end portion in the vicinity of a center portion of the picture element region 201, parallel to a storage capacitance line 6 and the gate bus line 2. A portion between the one end portion and the other end portion near the gate bus line 2 is parallel to the source bus lines 3.

Figure 8:
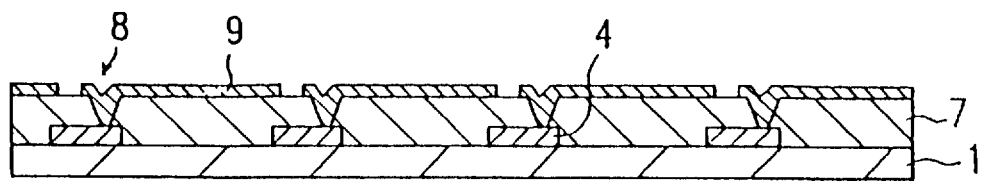
FIG. 8 is a cross-sectional view showing the active matrix substrate used in the liquid crystal display device according to the first example of the present invention.

As shown in FIG. 8, an interlayer insulating layer 7 is provided so as to generally cover the entire surface of the base substrate 1. Contact holes 8 are formed in the interlayer insulating layer 7 in the vicinity of the TFT 4. The pixel electrodes 9 are formed on the interlayer insulating layer 7 and connected with the drain electrodes 4a via the contact holes 8. The storage capacitance line 6 is provided on the base substrate 1 and beneath the interlayer insulating layer 7 and is connected to a common line (not shown).

The interlayer insulating layer 7 and the pixel electrodes 9 are provided as shown in FIG. 2. In the first example, an acrylic photosensitive resin is used as the interlayer insulating layer 7 with a surface free energy of 38 mN/m.

Then, as shown in FIGS. 5A and 5B, resist walls 21 made of a resist material (OMR83 produced by Tokyo Ohka Kogyo Co., Ltd.) is formed on the obtained active matrix substrate. The resist walls 21 are used to divide a liquid crystal region into picture element regions 201 during the process for forming an axially-symmetric orientation. Spacers 22 (shown in FIG. 6) are mixed in the resist walls 21 for adjusting a thickness of a cell. Preferably, the spacers 22 do not project from the resist walls 21 in a horizontal direction. In the case where the spacers 22 are exposed, a second resist is used to cover the projecting spacers 22.

A counter substrate opposing the active matrix substrate is produced after or prior to the production of the active matrix substrate. The counter substrate is provided with a color filter with a smoothed surface.

Then, the active matrix substrate and the counter substrate are disposed so as to oppose each other. The distance between the substrates is adjusted by the spacers 22. For example, in the first example, beads with a diameter of 4.5 $\mu$m are used as the spacers 22.

Subsequently, a mixture is injected between the substrates. The mixture contains 0.1 g of R-684 (produced by Nippon Kayaku Co., Ltd.), 0.1 g of p-phenyl styrene, 0.06 g of compound represented by the following formula I, 3.74 g of ZLI-4792 (produced by Merck & Co., Inc.) as a liquid crystal material which is adjusted to have a helical pitch of 90° by a chiral agent S-811, and 0.02 g of photopolymerization initiator (Irugacure 651). The chiral pitch is adjusted to be 90° in order to satisfy a first minimum condition under which a maximum transmittance is obtained.

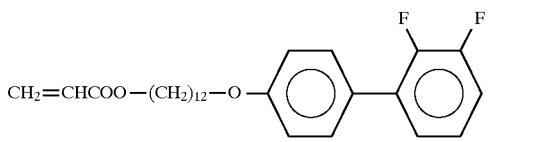

The mixture is maintained at 110° C., and thereafter gradually cooled down to deposit the liquid crystal phase.

After a plurality of liquid crystal regions are fused into a single liquid crystal region, the liquid crystal region is heated to reduce the size thereof to such a degree that the liquid crystal phase is not eliminated. At such a temperature, a voltage is applied for obtaining axially-symmetric orientation (i.e., an axially-symmetric orientation treatment). Subsequently, the liquid crystal region having the axially-symmetric orientation is cooled down to increase the size of the liquid crystal region.

Once the axially-symmetric orientation region is fully expanded within each picture element region 201, ultraviolet light with an energy of 2 mW/cm$^2$ (365 nm) is radiated toward the mixture from the active matrix substrate side for 30 minutes using a high pressure mercury lamp to cure the resin (i.e., an orientation fixing treatment).

Thereafter, the mixture is put back to a room temperature (e.g., 25° C.) and further irradiated with ultraviolet light for 10 minutes to ensure the resin cures using the same high pressure mercury lamp. Since shades may be created, for example, by the bus lines of the TFTs, the ultraviolet light may be radiated from a direction inclined from a normal to the substrate, or a light source which generates scattered ultraviolet light may be used.

Figure 9:
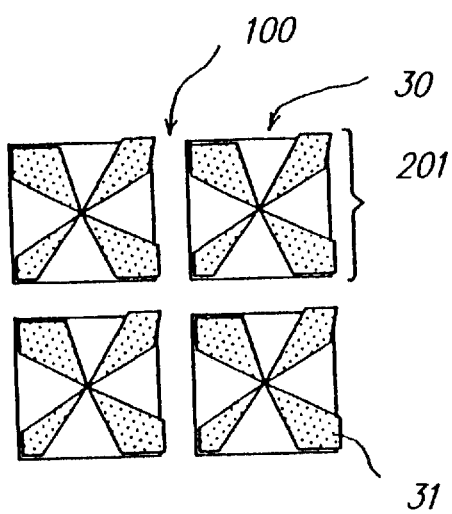
FIG. 9 is a plan view showing cells being observed with a polarizing microscope.

FIG. 9 is a plan view showing the cells produced in the above-described manner, observed with a polarizing microscope. As can be appreciated from FIG. 9, each liquid crystal region 30 is under a mono-domain state in which liquid crystal molecules are oriented in an axially-symmetric manner. Moreover, extinction patterns 31 are observed in the liquid crystal region 30. In this example, each liquid crystal region 30 corresponds to a picture element region 201 which contributes to substantial display.

Thereafter, a polarizing plate is provided on each of the main outer surfaces of the cell. The first polarizing plate has its polarizing axis in one direction while the second polarizing plate has its polarizing axis in a direction perpendicular to that of the first polarizing plate. In such a manner, the liquid crystal display device according to the first example of the present invention is completed.

Figure 10A:
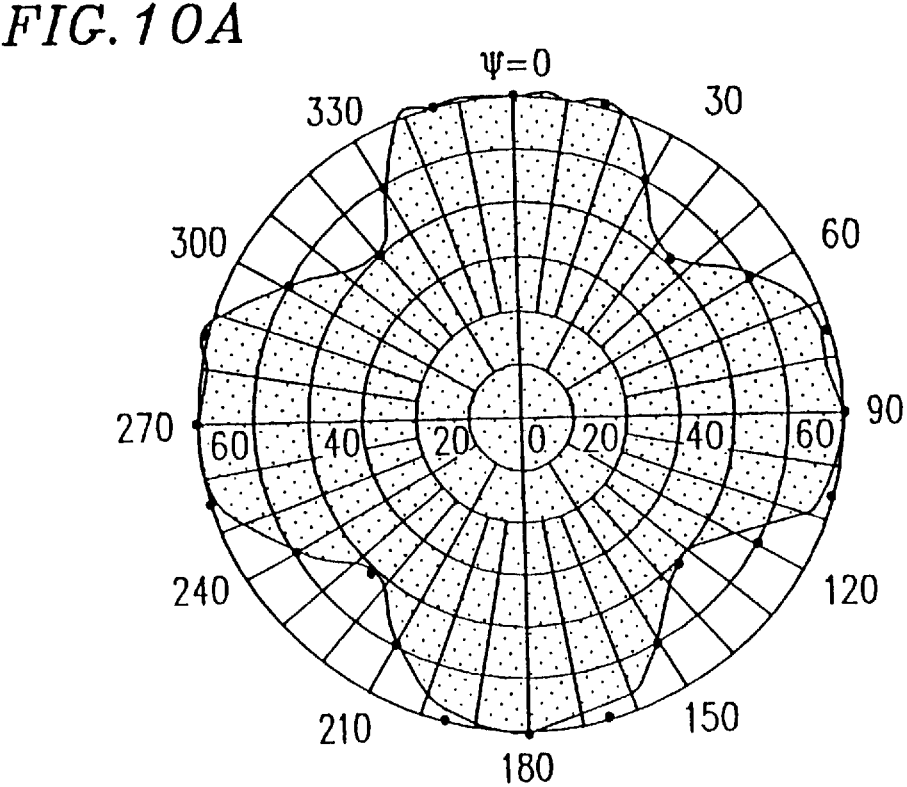
FIG. 10A is an iso-contrast diagram showing a viewing angle characteristic of an ASM liquid crystal display device according to the first example.
Figure 10B:
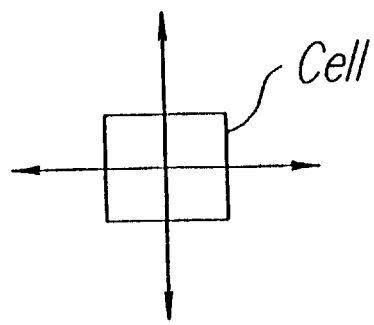
FIG. 10B is a schematic view showing a relationship between a cell and directions of axes of polarizing plates.

FIG. 10A is an iso-contrast diagram showing the display characteristic of the liquid crystal display device produced according to the first example of the present invention. FIG. 10B is a schematic view showing the relationship between the cell and the directions of the axes of the polarizing plates. As can be appreciated from FIG. 10A, the liquid crystal display device according to the first example has a much wider viewing angle characteristic.

When the liquid crystal display device according to the first example is observed with a viewing angle of 60° or more, minute Light leakage occurs in the vicinity of the source bus lines. In order to eliminate such a phenomenon, the resist walls 21 can be formed using a resist added with black coloring.

EXAMPLE 2

Figure 11:
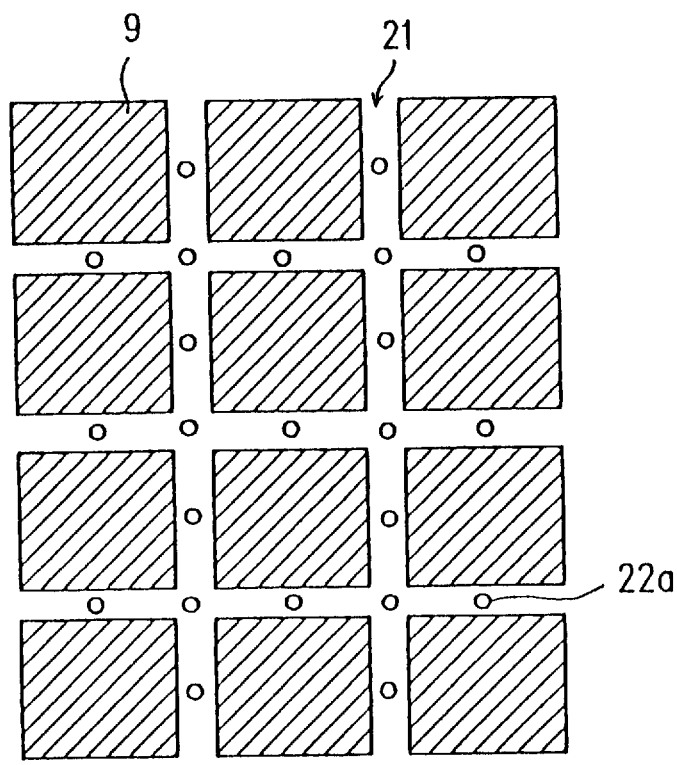
FIG. 11 is a plan view showing an active matrix substrate used in a liquid crystal display device according to a second example.

Hereinafter, a liquid crystal display device with an active matrix substrate according to a second example of the present invention will be described. According to the second example, as shown in FIG. 11, pillar-like spacers 22a (with a height of 4.5 μm from a surface of the pixel electrodes 9) are formed on the active matrix substrate by photolithography. The active matrix substrate is produced in the same manner as in the first example.

Thereafter, a cell is fabricated with the obtained substrate and a counter substrate and with the materials used in the first example. A mixture used in the first example is injected into the cell. Then, in the same manner as in the first example, the liquid crystal phase (liquid crystal molecule-rich) and isotropic phase (polymer-rich) are phase-changed to separate the liquid crystal phase from the isotropic phase. As a result, the liquid crystal phase tends to appear in the picture element regions 201 and the isotropic phase tends to appear outside the picture element regions 201, thereby obtaining an axially-symmetric orientation structure. The interlayer insulating layer outside the picture element regions 201 is found to act in the same manner as the resist walls 21 in the first example. In other words, in the case where the liquid crystal phase (nematic phase) and the isotropic phase are phase-changed in a cell which includes a pixel electrode (ITO) and a resin outside the pixel electrode with different surface tensions, the liquid crystal phase and the isotropic phase can be separated to appear on the pixel electrode portion and the portion outside the pixel electrode region, respectively. Accordingly, a liquid crystal phase can be formed in a picture element region 201 in the same manner as when the resist wall is used.

Thereafter, an axially-symmetric orientation treatment and an orientation fixing treatment (i.e., exposure to ultraviolet light) are performed in the same manner as in the first example. As a result, an axially-symmetric orientation substantially identical to that obtained in the first example is obtained.

Furthermore, after the fabrication of the substrate, plastic beads (Micropearl 4.5 μm produced by SEKISUI FINE CHEMICAL CO., LTD.), used as spacers, are dry scattered and blown with nitrogen gas so that the spacers on the pixel electrode are blown to stay on the interlayer insulating layer. Thereafter, a cell is produced in the same manner as in the first example.

Thus, the liquid crystal display device according to the second example of the present invention is completed having an axially-symmetric orientation similar to that obtained in the first example.

EXAMPLE 3

Hereinafter, a liquid crystal display device having an active matrix substrate according to a third example of the present invention will be described.

According to the third example, as shown in FIG. 3, the active matrix substrate is produced to include concave portions 20, as well as contact holes 8, in an interlayer insulating layer 7 corresponding to a center portion of each picture element region 201 using a different mask from that used in the first example. Pixel electrodes 9 are formed on the resultant layers, thereby completing the active matrix substrate.

A cell is fabricated using the produced active matrix substrate. In the same manner as in the first example, a display medium having an axially-symmetric orientation is formed.

The liquid crystal display device according to the third example of the present invention includes the active matrix substrate with concave portions 20. Thus, a liquid crystal region is generated in the center portion of each picture element region 201 during the axially-symmetric orientation treatment. At the same time, an axially-symmetric orientation axis is not shifted from the center portion of each picture element region 201 since the liquid crystal domain grows with the orientation state being maintained. Thus, a liquid crystal display device with minimum display roughness can be produced.

EXAMPLE 4

Hereinafter, a liquid crystal display device including an active matrix substrate according to a fourth example of the present invention will be described.

Figure 12:
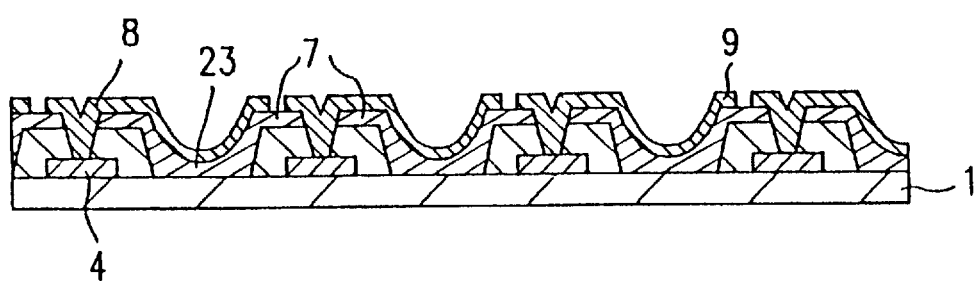
FIG. 12 is a cross-sectional view showing an active matrix substrate used in a liquid crystal display device according to a fourth example.

According to the fourth example, an interlayer insulating layer 7 having the contact holes 8 and the concave portions 20 described in the third example are formed. Then, as shown in FIG. 12, a second insulating layer 23 having spherically concave portions is formed to smoothen the deformation of the upper surface created by the presence and the absence of the interlayer insulating layer 7 (as shown in FIG. 12, areas where the interlayer insulating layer 7 is absent correspond to the concave portions 20). Pixel electrodes 9 are formed on the resultant layers, having spherically concaved surfaces.

A cell is fabricated using the produced active matrix substrate. In the same manner as in the first example, a liquid crystal display device is produced which includes picture element regions 201 with an axially-symmetric orientation.

In the liquid crystal display device according to the fourth example, the axially-symmetric orientation axes are centered according to the same principle described in the third example.

Although the surfaces of the pixel electrodes 9 are spherically concaved according to the fourth example, the present invention is not limited thereto. A step structure as shown in FIG. 4B may also be employed. In this case, too, the symmetric orientation axes are centered in a like manner.

Furthermore, the spherically concave portions may be formed in the counter substrate having the color filter, or may be formed in both substrates. This also applies to the case where the concave portions 20 described in the third example are used or to the case where the step structure is used. These alternatives are also applicable in the above-described first, second and third examples.

EXAMPLE 5

Hereinafter, a liquid crystal display device according to a fifth example of the present invention will be described.

The liquid crystal display device includes the active matrix substrate and the counter substrate produced in the first example. Both substrates are coated with Nylon 66 by spin coating to form spherulites. A cell is fabricated using such substrates with the thickness of the cell being maintained by spacers at 5 $\mu$m.

Figure 16:
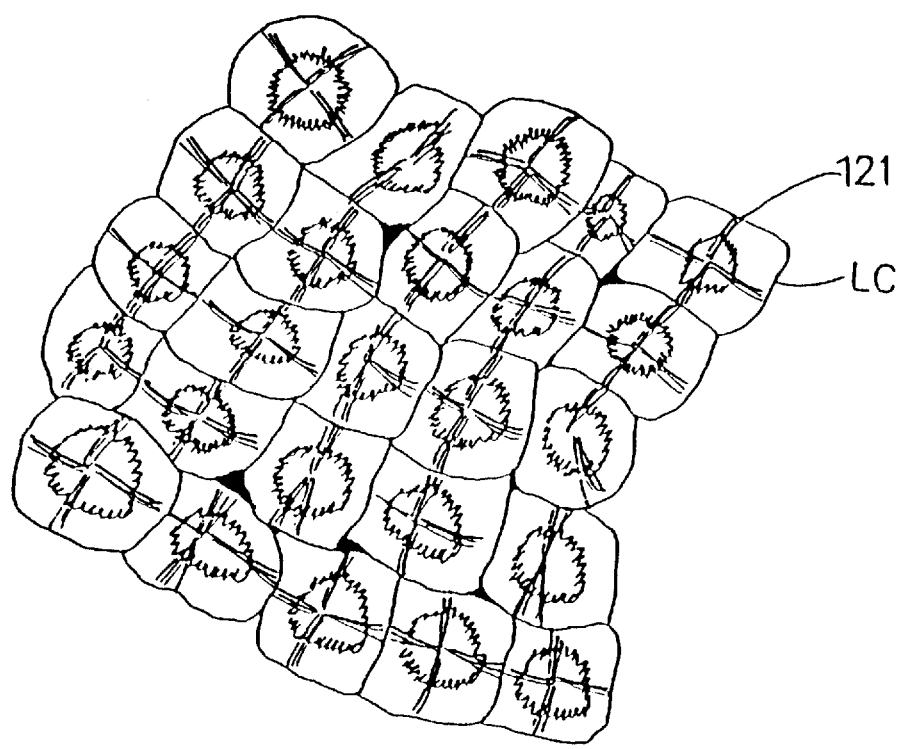
FIG. 16 is a view illustrating liquid crystal molecules oriented in an axially-symmetric manner along the spherulites formed on the substrate.

Only a liquid crystal material, for example, ZLI-4792 (produced by Merck & Co., Inc.) which is adjusted to have a helical pitch of 90° by a chiral agent S-811, is injected into the above-described cell. As shown in FIG. 16, the liquid crystal molecules in the cell are oriented in an axially-symmetric manner along the spherulites formed on the substrate. The reference numeral 121 in FIG. 16 denotes an extinction portion.

Then, in the same manner as in the first example, two polarizing plates are provided on the outer surfaces of the cell.

The liquid crystal display device according to the fifth example has an excellent viewing angle characteristic when viewed from a direction shifted from a normal to the substrate. In addition, a viewing angle characteristic is symmetrical over an entire display screen with respect to a normal to the substrate.

EXAMPLE 6

Hereinafter, a liquid crystal display device according to a sixth example of the present invention will be described.

The liquid crystal display device according to the sixth example employs the active matrix substrate and the counter substrate produced in the first example. Both substrates are coated with polyimide by spin coating with no rubbing treatment. A cell is produced by using the produced substrates with the thickness of the cell being maintained by spacers at 5 $\mu$m.

Then, a liquid crystal material, for example, ZLI-4792 (produced by Merck & Co., Inc.) which is adjusted to have a helical pitch of 90° by a chiral agent S-811, is injected into the above-described cell. The liquid crystal molecules in the cell are randomly oriented due to weak orientation controlling forces of the coated substrates. Then, in the same manner as in the first example, two polarizing plates are provided on the outer surfaces of the cell.

The liquid crystal display device according to the sixth example also has an excellent viewing angle characteristic when viewed from a direction shifted from a normal to the substrate. In addition, a viewing angle characteristic is symmetrical over an entire display screen with respect to a normal to the substrate.

EXAMPLE 7

A liquid crystal display device according to a seventh example of the present invention will be described. According to the seventh example, a cell is fabricated in the same manner as in the first example to form liquid crystal regions having an axially-symmetric orientation, except the active matrix substrate includes contact holes 8 formed in a center portion of each picture element region 201 as shown in FIG. 1.

By incorporating such an active matrix substrate, axially-symmetric orientation axes of the liquid crystal display device according to the seventh example are formed in portions corresponding to the contact holes 8 and are not shifted therefrom. Moreover, a disclination point at each axis portion is shielded by the storage capacitance line 6. Thus, the liquid crystal display device according to the seventh example has an excellent contrast with no display roughness.

Comparative Example 1

Hereinafter, a liquid crystal display device according to a first comparative example will be described to further the inventive features of the invention over prior art devices. The liquid crystal display device includes the active substrate and the counter substrate used in the first example which are coated with polyimide by spin coating and subjected to rubbing treatment using a nylon cloth. A TN cell is formed with the produced substrates (which are disposed so that the rubbing directions thereof are perpendicular to each other) and spacers having a height of 5 $\mu$m for adjusting the thickness of the cell. ZLI-4792 (produced by Merck & Co., Inc.) is injected into the cell as a liquid crystal material (which is adjusted to have a helical pitch of 80 $\mu$m by a chiral agent S-811). The produced cell is interposed between the polarizing plates, thereby completing the TN cell.

Figure 13A:
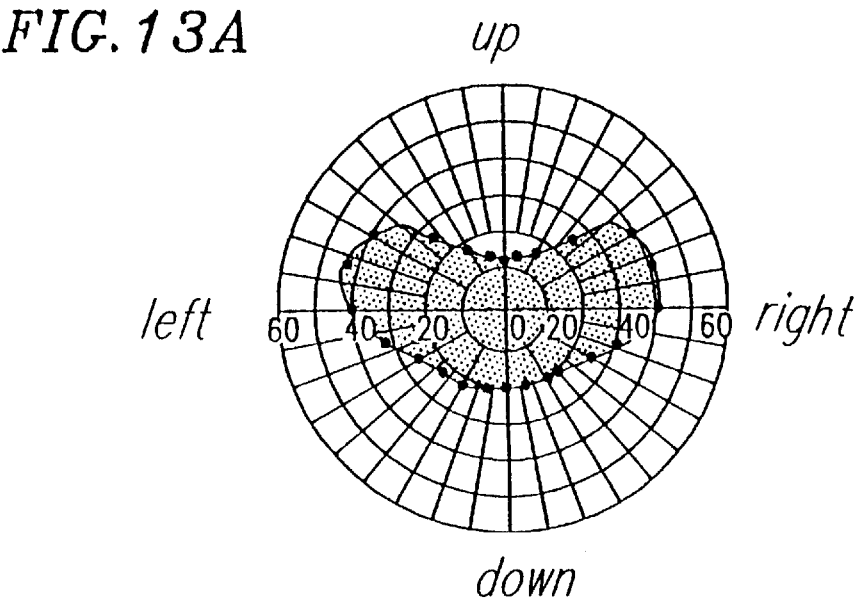
FIG. 13A is an iso-contrast diagram showing a viewing angle characteristic of a TN liquid crystal display device according to first and second comparative examples.
Figure 13B:
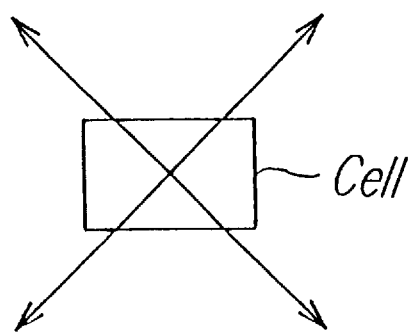
FIG. 13B is a schematic view showing a relationship between a cell and directions of axes of polarizing plates according to the first and second comparative examples.

FIG. 13A is an iso-contrast diagram showing the characteristic of -the liquid crystal display device according to the first comparative example. FIG. 13B is a schematic view showing the relationship between the cell and the directions of the axes of the polarizing plates. As can be appreciated from FIG. 13A, the liquid crystal display device according to the first comparative example has an asymmetric orientation and has a significantly narrower viewing angle characteristic compared with the liquid crystal display devices described in the first through sixth examples according to the present invention.

Comparative Example 2

Figure 14:
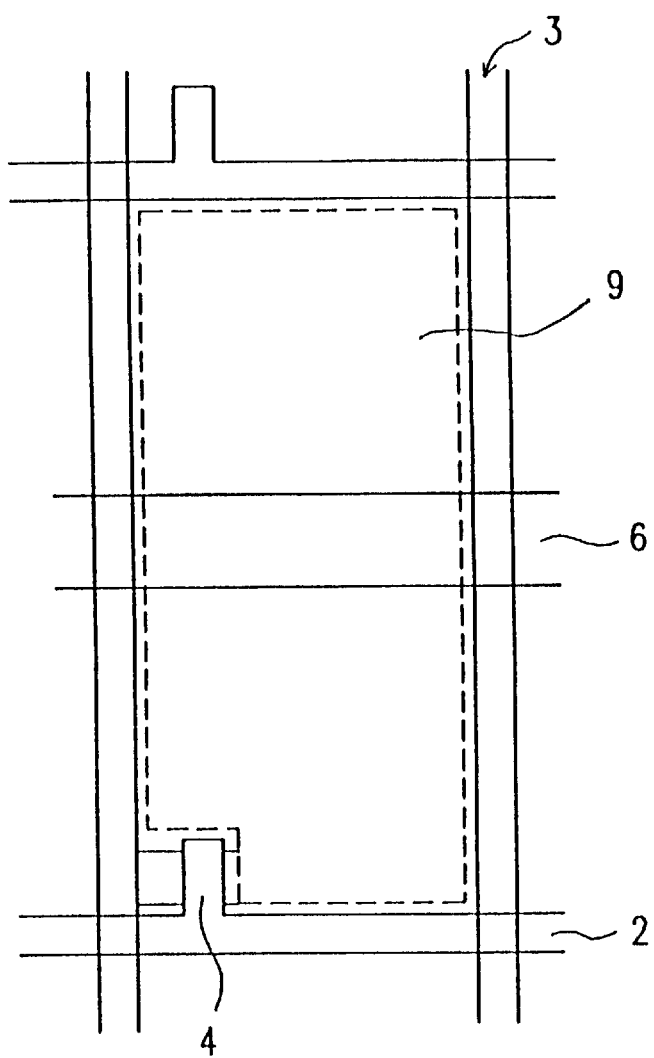
FIG. 14 is a plan view showing an active matrix substrate according to the second comparative example.
Figure 15A:
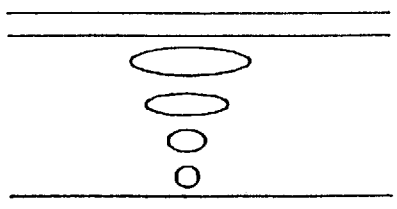
FIG. 15A is a cross-sectional view showing liquid crystal molecules in a cell of a conventional liquid crystal display device provided with a pretilt angle under an initial orientation state.
Figure 15D:
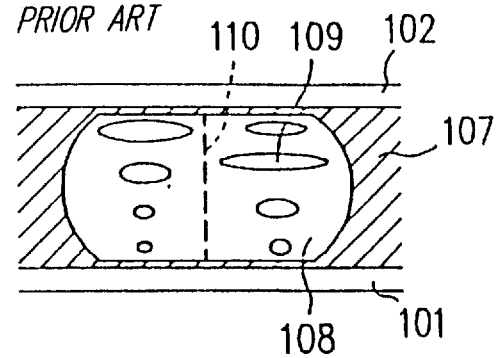
FIG. 15D is a cross-sectional view showing a cell of another conventional liquid crystal display device.
Figure 15B:
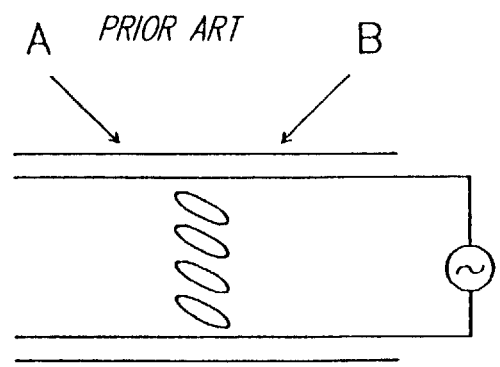
FIG. 15B is a cross-sectional view showing the liquid crystal molecules in the cell of the conventional liquid crystal display device under application of a voltage.
Figure 15E:
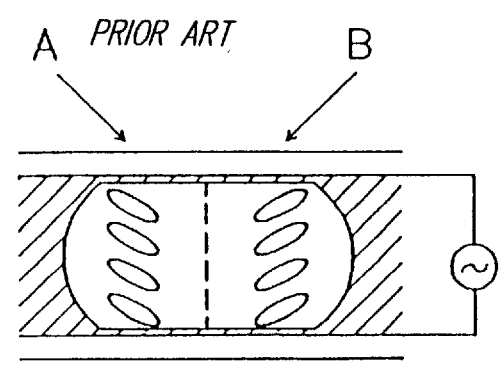
FIG. 15E is a cross-sectional view showing liquid crystal molecules in the cell of the conventional liquid crystal display device under application of a voltage.
Figure 15C:
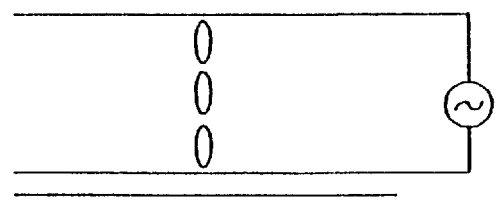
FIG. 15C is a cross-sectional view showing the cell of the conventional liquid crystal display device under application of a saturation voltage.
Figure 15F:
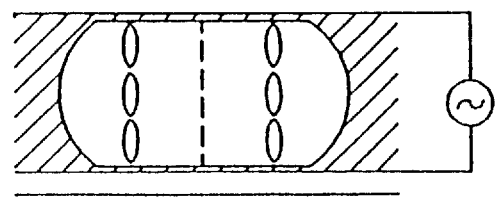
FIG. 15F is a cross-sectional view showing the cell of the conventional liquid crystal display device under application of a saturation voltage.

Hereinafter, a liquid crystal display device according to a second comparative example will be described to further the inventive features of the invention over prior art. FIG. 14 is a plan view showing the active matrix substrate used in a liquid crystal display device according to the second comparative example. The active matrix substrate is not of a pixel on passivation structure and instead, of a conventional structure in which pixel electrodes 9, gate bus lines 2 and source bus lines 3 are formed on a same level. A TN liquid crystal display device is produced with such an active matrix substrate in the same manner as in the first comparative example.

The following table shows transmittance ratios and viewing angle characteristics of the liquid crystal display devices according to the first, fifth and sixth examples of the present invention, and the liquid crystal display devices according to the first and second comparative examples. Each transmittance ratio is shown relative to the transmittance ratio of the liquid crystal display device according to the second comparative example (which is assumed to be 1 for simplicity).

TABLE 1

|  | Example 1 | Example 5 | Example 6 | Comparative Example 1 | Comparative Example 2 |
|---|---|---|---|---|---|
| Transmittance ratio | 1.1 | 1.0 | 1.0 | 1.3 | 1 |
| Viewing angle characteristics | ○ | ○ | ○ | X | X |

In table 1, ○ represents a wider viewing angle characteristic as shown in FIG. 10A and x represent an asymmetric viewing angle characteristic as shown in FIG. 13A.

As can be appreciated from the table, each of the liquid crystal display devices according to the first and the second comparative examples has a poor viewing angle characteristic whereas the liquid crystal display devices according to the present invention exhibits great improvement in the viewing angle characteristics. Furthermore, as to the transmittance, the liquid crystal display devices according to the present invention remain equivalent to or higher than the conventional liquid crystal display device according to the second comparative example.

According to the present invention, a liquid crystal display device can be produced with the viewing angle characteristic thereof and the brightness (transmittance) thereof being enhanced. Moreover, in the case where a mixture containing a liquid crystal material and a photo-curing resin is used for obtaining a liquid crystal display device of an axially symmetrically aligned micro cell mode (i.e., an ASM mode), a structure that is required for controlling the axially-symmetric orientation axes can be fabricated without complicating the production steps and thus realizing a low production cost. Furthermore, by setting the surface free energy of the interlayer insulating layer to 40 mN/m or lower, the spacers can be provided at prescribed locations.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device having a pair of substrates with a display medium interposed therebetween, comprising:

a plurality of scanning lines and a plurality of data lines provided on one of the pair of substrates so as to cross each other;

a plurality of switching elements, each of the switching elements being connected with one of the scanning lines and one of the data lines;

an insulating layer provided so as to cover the plurality of scanning lines, the plurality of data lines, and the plurality of switching elements;

a plurality of transparent pixel electrodes provided on the insulating layer, each of the transparent pixel electrodes partially overlapping at least one scanning line and at least one data line; and a plurality of contact holes formed in the insulating layer, through each of which an output terminal of a respective switching element and a respective transparent pixel electrode are connected, wherein at least one liquid crystal region exists over each of the transparent pixel electrodes, wherein the at least one liquid crystal region is surrounded by a region made mainly of a polymer material and is formed due to a difference between a surface free energy of the surface of the insulating layer and a surface free energy of the surface of the transparent pixel electrode, and wherein the display medium contains a liquid crystal material, and liquid crystal molecules of the insulating layer corresponding to a center of each of the pixel electrodes, whereby a position of an axially-symmetric orientation axis is controlled.

2. A liquid crystal display device according to claim 1, wherein the liquid crystal molecules are oriented in an axially-symmetric orientation with respect to an axis perpendicular to surfaces of the pair of substrates.

3. A liquid crystal display device according to claim 1, wherein the liquid crystal molecules are twisted between the pair of substrates by about 90°.

4. A liquid crystal display device according to claim 2, wherein the liquid crystal region includes the liquid crystal molecules oriented in an axially-symmetric manner.

5. A liquid crystal display device according to claim 1, further comprising a concave portion formed in a portion of the insulating layer corresponding to a center of each of the transparent pixel electrodes, whereby a position of an axially-symmetric orientation axis is controlled.

6. A liquid crystal display device according to claim 2, wherein each of the transparent pixel electrodes has either a spherically concave structure or a step structure for controlling a position of an axially-symmetric orientation axis.

7. A liquid crystal display device according to claim 1, further comprising at least one thickness adjustor provided between the pair of substrates, the adjustor being provided over at least the scanning lines or the data lines, whereby a gap between the pair of substrates is maintained.

8. A liquid crystal display device according to claim 1, wherein a surface free energy of the surface of the insulating layer is approximately 40 mN/m or less.

9. A liquid crystal display device according to claim 1, further comprising a wall provided outside the transparent pixel electrode or at least a portion outside a picture element region, the picture element region corresponding to a portion defined between the transparent pixel electrode and a counter electrode, wherein the height of the wall is less than the thickness of the cell.

10. A liquid crystal display device according to claim 9, wherein the wall is made of a black resist.

11. A liquid crystal display element according to claim 1, wherein the surface free energy of the surface of the transparent pixel electrode is from about 80 mN/m to about 100 mN/m.

12. A liquid crystal display element according to claim 1, wherein the difference between the surface free energy of the surface of the insulating layer and the surface free energy of the surface of the transparent pixel electrode is from about 40 mN/m to about 99.9 mN/m.

* * * * *